(12) United States Patent
Rodolico

(10) Patent No.: US 7,506,349 B2
(45) Date of Patent: Mar. 17, 2009

(54) METHOD AND APPARATUS FOR PROCESSING TELEVISION SYSTEM MESSAGES RECEIVED WHEN A DEVICE IS IN A LOW POWER MODE

(75) Inventor: Joseph T. Rodolico, Horsham, PA (US)

(73) Assignee: Panasonic Corporation, Osaka (JP)

( * ) Notice: Subject to any disclaimer, the term of this patent is extended or adjusted under 35 U.S.C. 154(b) by 955 days.

(21) Appl. No.: 10/812,114

(22) Filed: Mar. 29, 2004

(65) Prior Publication Data
US 2005/0216943 A1 Sep. 29, 2005

(51) Int. Cl.
  H04N 7/10 (2006.01)
  H04N 7/025 (2006.01)
  H04N 7/173 (2006.01)
(52) U.S. Cl. .............. 725/33; 725/32; 725/34; 725/35; 725/108
(58) Field of Classification Search .......... 725/16, 725/25, 32–35, 39, 50, 51, 54, 56, 105, 107, 725/110, 115, 116, 117, 131, 132, 134, 140, 725/142, 147, 151, 152, 108
See application file for complete search history.

(56) References Cited

U.S. PATENT DOCUMENTS

| | | | |
|---|---|---|---|
| 3,993,955 A | 11/1976 | Belcher et al. | |
| 4,155,042 A * | 5/1979 | Permut et al. | 340/7.5 |
| 5,121,430 A | 6/1992 | Ganzer et al. | |
| 5,659,366 A | 8/1997 | Kerman | |
| 5,701,161 A | 12/1997 | Williams et al. | |
| 6,052,556 A | 4/2000 | Sampsell | |
| 7,058,458 B2 * | 6/2006 | Munezane | 700/12 |
| 7,239,359 B2 * | 7/2007 | Matsuyama et al. | 348/732 |
| 2002/0078388 A1 | 6/2002 | Wickham | |
| 2002/0124266 A1 | 9/2002 | Blanchard | |
| 2003/0208756 A1 | 11/2003 | Macrae et al. | |

FOREIGN PATENT DOCUMENTS

| | | |
|---|---|---|
| EP | 0 912 053 A1 | 4/1999 |
| EP | 1 158 685 A1 | 11/2001 |
| GB | 2 360 898 A | 10/2001 |
| WO | WO 03/069933 | 8/2003 |

* cited by examiner

Primary Examiner—Hunter B. Lonsberry
(74) Attorney, Agent, or Firm—RatnerPrestia

(57) ABSTRACT

Methods and apparatus for processing system message data received at an electronic device that is in a low power mode are disclosed. System message data is processed by receiving at least one system message including data for processing by the electronic device while the electronic device is in the low power mode, generating a message available indicator responsive to the at least one system message, generating a process message signal responsive to at least one of (i) the message available indicator and (ii) the data of the at least one system message, transitioning device circuitry within the electronic device from a powered down state to a powered up state responsive to the process message signal, and processing the data of the at least one system message using the device circuitry in the powered up state.

23 Claims, 3 Drawing Sheets

METHOD AND APPARATUS FOR PROCESSING TELEVISION SYSTEM MESSAGES RECEIVED WHEN A DEVICE IS IN A LOW POWER MODE

FIELD OF THE INVENTION

The present invention relates to the field of television and, more particularly, to methods and apparatus for processing television system messages received when a device is in a low power mode.

BACKGROUND OF THE INVENTION

Television service providers periodically send television system messages to electronic devices configured for use with their television systems. The television system messages may contain application data such as an electronic program guide (EPG) and system information such as channel mapping parameters (e.g., channel frequency, modulation mode and virtual channel number reference) for accessing television services.

Device circuitry within the electronic devices processes the system messages. Television service providers typically require that the device circuitry is continuously "powered up," even if the electronic device is in a low power mode such as a standby mode. If the device circuitry is not powered up, system message may be missed and it may take several hours for redistribution of the system messages, e.g., due to a "carousel" format of the National Authorization Service (NAS) commonly used to distribute system messages. Prior to receiving the system messages, the device circuitry may incorrectly tune channels or exhibit undesirable operating effects.

The television system messages may occur infrequently and generally have a duration of a few seconds to a few minutes. Thus, when the electronic device is in the low power mode, the device circuitry remains fully powered even though it is rarely used. Since there is an ever present desire to reduce the amount of energy consumed by electronic devices, there is a need for methods and apparatus for processing system messages without requiring that the device circuitry is continuously powered up. The present invention fulfills this need among others.

SUMMARY OF THE INVENTION

The present invention is embodied in methods and apparatus for processing system messages received at an electronic device that is in a low power mode. System message data is processed by receiving at least one system message including data for processing by the electronic device while the electronic device is in the low power mode, generating a message available indicator responsive to the at least one system message, generating a process message signal responsive to at least one of (i) the message available indicator and (ii) the data of the at least one system message, transitioning device circuitry within the electronic device from a powered down state to a powered up state responsive to the process message signal, and processing the data of the at least one system message using the device circuitry in the powered up state.

DETAILED DESCRIPTION OF THE INVENTION

Figure 1:
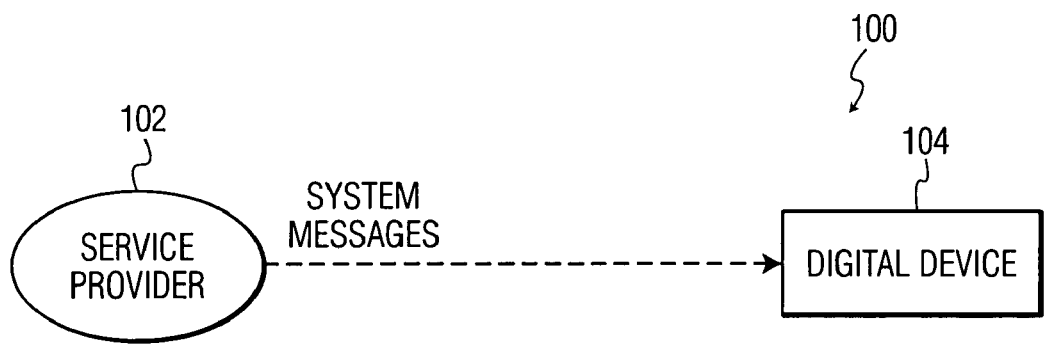
FIG. 1 is a block diagram of a television system in accordance with the present invention.

FIG. 1 is a conceptual representation of an exemplary television system 100 in which television system messages (referred to herein as system messages) are passed from a service provider 102 to one or more electronic devices (represented by electronic device 104). The service provider 102 provides television services to the electronic device 104. The service provider 102 may be an Internet, cable, satellite, terrestrial, wireless or essentially any content provider that delivers system messages.

The system messages include data for processing such as system information and application data. System information includes, by way of non-limiting example, channel maps, time stamps, conditional access messages, and emergency alert system (EAS) messages. Application data includes, by way of non-limiting example, information such as electronic program guide (EPG) information. Typically, the system messages are coded using a proprietary algorithm associated with the service provider 102. The system information and application data may be interleaved by the service provider 102 and passed to the electronic device 104.

Figure 2:
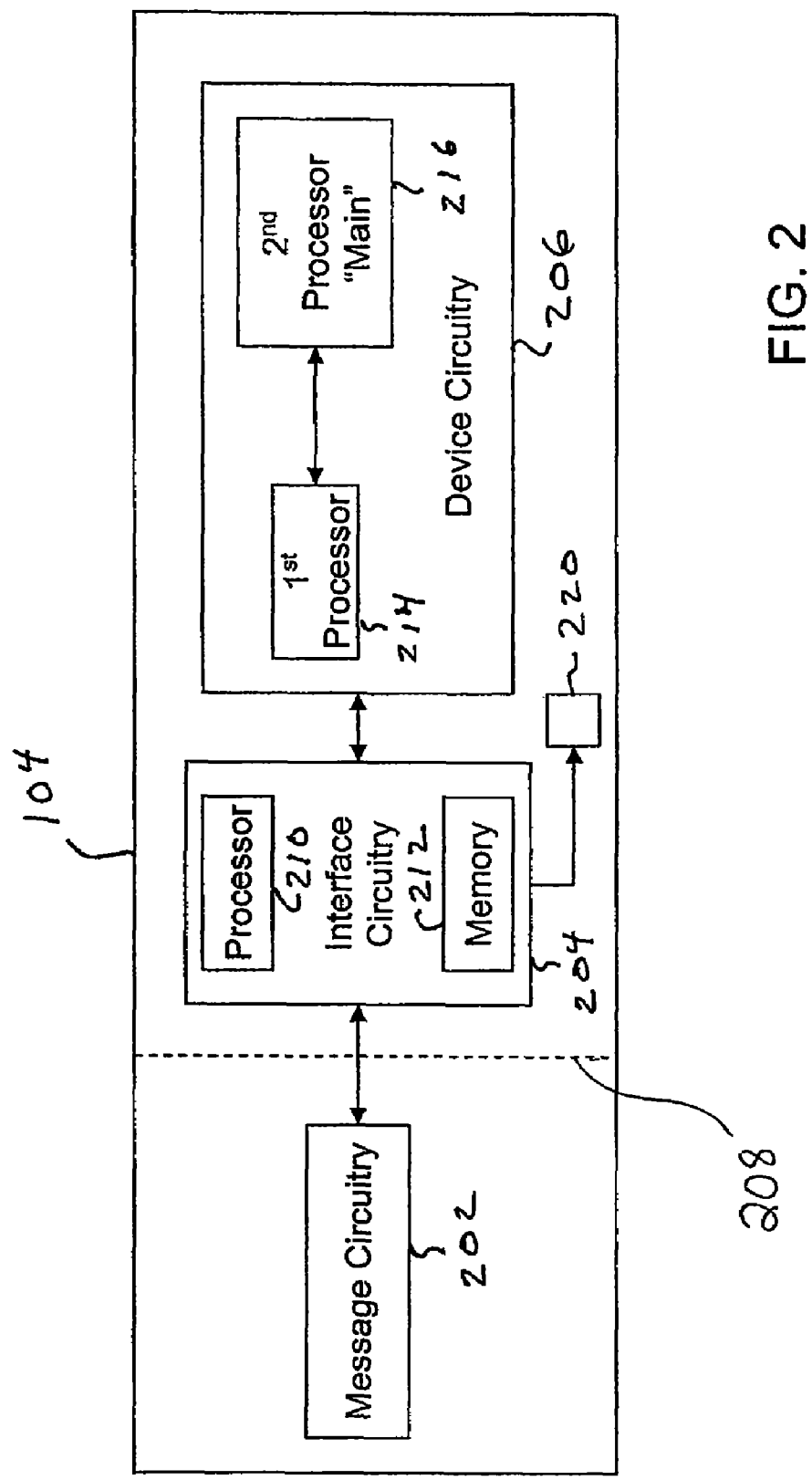
FIG. 2 is a block diagram of an exemplary electronic device for use in the television system of FIG. 1.

The electronic device 104 receives the system messages from the service providers 102 for processing. FIG. 2 depicts an exemplary electronic device 104. The illustrated electronic device 104 in FIG. 2 includes message circuitry 202, interface circuitry 204, and device circuitry 206. The message circuitry 202 may be detachable from the interface circuitry (which is indicated by a dashed line 208). In embodiments where the message circuitry 202 is detachable, the message circuitry 202 may be a module or a card that is inserted into a module/card port (not shown) coupled to the interface circuitry 204.

The message circuitry 202 receives system messages from the service provider 102 (FIG. 1) for delivery to the interface circuitry 204. In an exemplary embodiment, the message circuitry 202 is security circuitry that decodes the system messages using the proprietary algorithms of the service provider 102. The message circuitry 202 may be a removable security module/card that may be easily exchanged to enable compatibility with other service providers.

The message circuitry 202 is further configured to generate a message available indicator. In an exemplary embodiment, the message available indicator is an interrupt that is generated when a system message is received at the message circuitry 202 from the service provider 102. In an alternative exemplary embodiment, the message available indicator is a signal generated in response to a polling signal from the interface circuitry 204, if a system message is available at the message circuitry 202. In accordance with this embodiment, the interface circuitry 204 frequently polls the message circuitry 202. If a system message is not available at the message circuitry 202 when polled, the message circuitry 202 may generate a response indicating a message is not present or may provide no response. If a system message is available at the message circuitry 202, when polled, the message circuitry 202 generates the message available indicator.

The interface circuitry 204 receives the system messages via the message circuitry 202. The illustrated interface circuitry 204 includes a processor 210 and a memory 212. Incoming system messages received from the message circuitry 202 are received by the processor 210. The processor 210 is configured to store the system messages in the memory 212 as needed and transfer system messages to the device circuitry 206. A suitable processor 210 and memory 212 for use in the present invention will be understood by those of skill in the art from the description herein.

The interface circuitry 204 may receive the system messages by requesting them in response to a message available indicator from the message circuitry 202. In an exemplary embodiment, the message available indicator is generated by the message circuitry 202 when a system message is available in response to a polling signal from the interface circuitry 204. In an alternative exemplary embodiment, the message available indicator is an interrupt generated by the message circuitry 202 when a system message is available.

In an exemplary embodiment, the interface circuitry 204 (e.g., the processor 210 within the interface circuitry 204) is further configured to generate a process message signal for the device circuitry 206. The process message signal is generated responsive to an available system message. In an exemplary embodiment, the process message signal is generated responsive to the message available indicator from the message circuitry 202. In an alternative exemplary embodiment, the interface circuitry 204 stores one or more system messages in the memory 212 and generates the process message signal when a predefined number of system messages (e.g., one or more) are stored in the memory or when a predefined portion of the memory used for storing system messages is exceeded (e.g., 50%).

In other exemplary embodiments, the process message signal is generated in response to the data content of the system messages. For example, the process message signal may be generated in response to the identification of a system message with new data content and/or to the identification of a system message having a certain priority level. Whether a system message is new may be determined using techniques that will be understood by those of skill in the art, e.g., using versioning or checksum values. In an exemplary embodiment, versioning and/or checksum values for system messages already processed by the device circuitry 206 may be passed to the interface circuitry 204 when the device circuitry 206 is going to enter the powered down state. The interface circuitry may then compare versioning and/or checksum value for an incoming system message with versioning and/or checksum values for system messages already processed by the device circuitry 206, and only generate the process message signal if the versioning and/or checksum values do not match. If the versioning and/or checksum values match, which indicates the system message does not contain new information, that system message may be discarded without the process message signal being generated.

Whether a system message has a certain priority level may be determined by assigning each system message a priority level at the service provider 102 and viewing the assigned priority level at the interface circuitry 204 to identify the priority level. In an exemplary embodiment, system messages may be assigned a low, medium, and high priority level. System messages having a high (first) priority level, e.g., an emergency alert message (EAS), may result in the generation of the process message signal when they are received, while system messages having a lower (second) priority level may be stored in the memory 212 before the generation of the process message signal. The system messages having the lower priority level may be stored until a high priority message signal is received, the memory is filled to a predefined level, or the electronic device 104 enters the full power mode. In addition, the identification of a high priority system messages by the interface circuitry 204 may cause an audible and/or visual emission from a notification device 220 (e.g., a speaker or a light emitting diode) associated with the electronic device 104 regardless of whether the system message is passed to the device circuitry 206 for processing.

The device circuitry 206 is coupled to the device interface circuitry 204 and is configured to receive and process system messages. In the illustrated embodiment, the device circuitry includes a first processor 214 and a second ("main") processor 216, which are described in further detail below. The device circuitry 206 may further include other components including a tuner, memory, video decoder, and I/O port, which are not shown to simplify illustration of the present invention. The device circuitry 206 may also include a display (not shown), e.g., if the electronic device 104 is a television, or may not include a display, e.g., if the electronic device 104 is, for example, a digital radio or set top box television receiver.

The device circuitry 206 is configured for operation in one of at least two states including a powered up state and a powered down state. In the powered up state, components within the device circuitry 206 used to process system messages are in a processing state capable of processing the system messages. In the powered down state, one or more components within the device circuitry 206 used to process system messages are in a standby state incapable of processing system messages. In an exemplary embodiment, the device circuitry 206 is further configured to notify the interface circuitry 204 when the device circuitry 206 is going to enter the powered up state and the powered down state. The device circuitry 206 may be configured in the powered up state responsive to the process message signal received from the interface circuitry 204 or in response to the electronic device 104 being placed in the full power mode. In addition, the device circuit 206 may be configured in the powered down state when all available system messages have been processed or in response to the electronic device 104 being place in the low power mode.

In an exemplary embodiment, the first processor 214 within the device circuitry 206 generates a power up signal responsive to a process message signal received from the interface circuitry 204 or to a power on command placing the electronic device 104 in a full power mode. The power on command may be generated responsive to an "on" command received from a user, e.g., from a remote control device (not shown) operated by the user. The first processor 214 is capable of processing the process message signal regardless of whether the device circuitry 206 is in the powered up state or the powered down state. The first processor 214 may be a processor, states machine, logic gates, or essentially any device capable of processing digital signals. An example of a suitable first processor 214 may be found in conventional infra-red detectors, which are typically used to transition a television from a standby mode to an active mode in response to an infra red signal from a remote control device (not shown).

The second processor 216 is coupled to the first processor 214 and is configured to process the system messages. The second processor 216 operates in one of at least two states including the processing state and the standby state. The second processor 216 is configured to transition from the standby state to the processing state responsive to the powered up signal from the first processor 214. Additionally, the second processor 216 may be configured to transition from the processing state to the standby state when all available system messages have been processed by the device circuitry 206, e.g., after a predefined period of time following the processing of a system message without the receipt of a powered up signal. The second processor may be the main processor for the electronic device 104. A suitable second processor 216 will be understood by those of skill in the art from the description herein and may be integrated within the same integrated circuit as the first processor 214.

Figure 3:
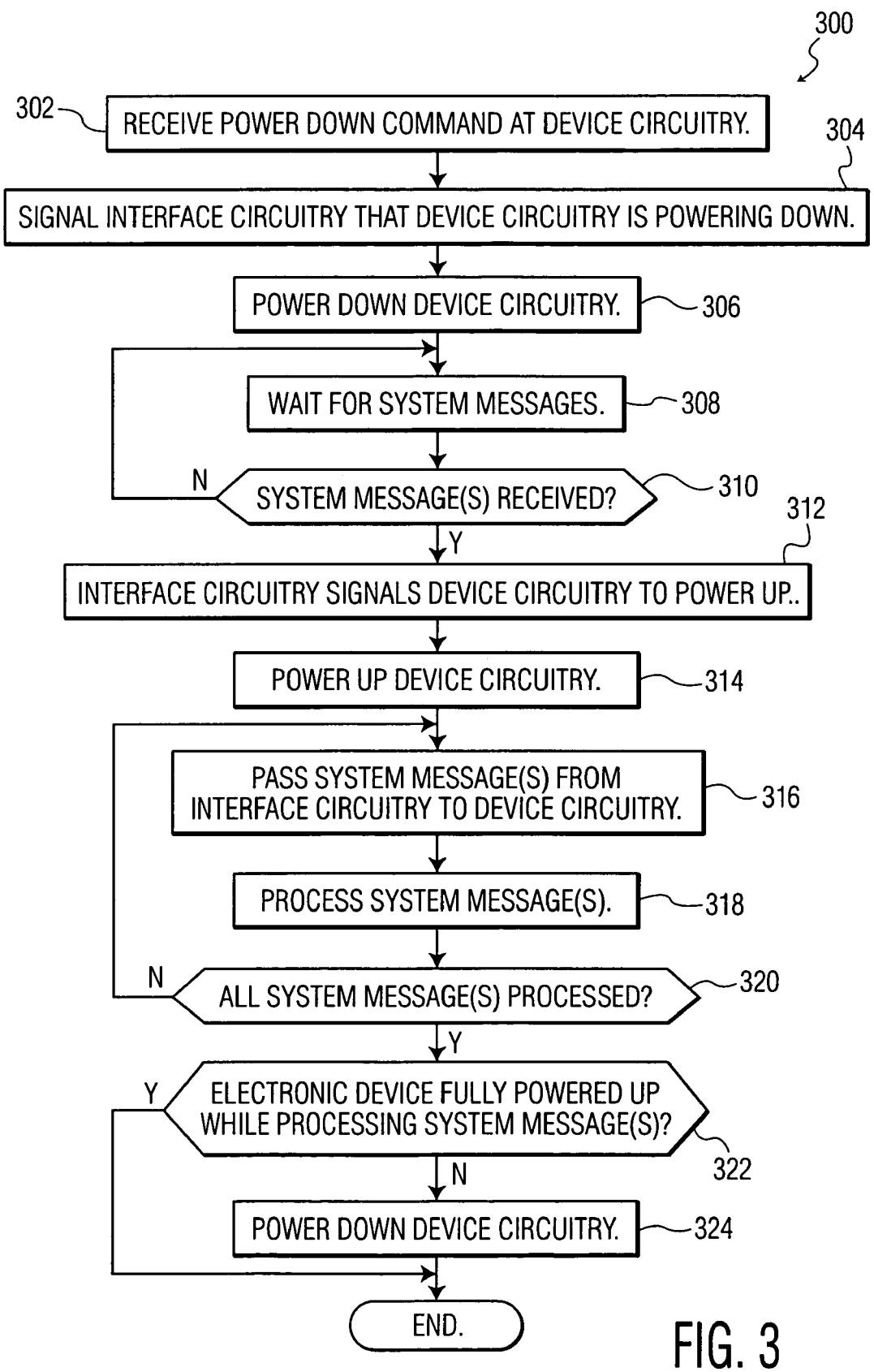
FIG. 3 is a flow chart of exemplary processing steps in accordance with the present invention.

FIG. 3 depicts a flow chart 300 of exemplary steps for processing system messages in accordance with the present invention. The steps of FIG. 3 are described with reference to FIG. 1 and FIG. 2.

At block 302, the electronic device 104 receives a power down command. The power down command may be generated by a remote control device (not shown) or a button on a keypad (not shown) coupled to the electronic device 104.

At block 304, the device circuitry 206 signals the interface circuitry 204 that the device circuitry 206 is powering down. At block 306, the device circuitry enters a powered down state.

At block 308, the interface circuitry 204 waits for a system message(s) from the service provider 102. The interface circuitry 204 may wait for the system message by periodically polling the message circuitry 202 or by waiting for an interrupt to be generated by the messages circuitry 202.

Block 310 determines if a system message is available. If a system message is available, processing proceeds at block 312. If a system message is not available, processing returns to block 308 to continue to wait for system messages. In an exemplary embodiment, whether a system message is available is determined by the receipt of a message available indicator from the message circuitry 202 at the interface circuitry 204. The message available indicator may be an interrupt generated by the message circuitry 202 or a signal generated by the message circuitry 202 in response to polling by the interface circuitry 204.

At block 312, the interface circuitry 204 signals the device circuitry 206 to transition from the powered down state to the powered up state and, at block 314, the device circuitry enters the powered up state in preparation for processing the system messages. In an exemplary embodiment, the device circuitry 206 generates a signal that is passed to the interface circuitry 204 when the device circuitry 206 is ready to process the system messages.

In an alternative embodiment, system messages are stored in the interface device 204, e.g., memory 212, until the device circuitry 206 enters the powered up state responsive to a command for the electronic device 104 to enter the full power mode.

At block 316, system messages are passed from the interface circuitry 204 to the device circuitry 206 for processing. At block 318, the device circuitry 206 processes the system messages in a known manner.

Block 320 determines if all system messages have been processed. If all system messages have been processed, processing proceeds at block 322. If all system messages have not been processed, processing return to block 316 for the transfer of additional system messages.

Block 322 determines if the electronic device 104 entered a fully power mode during processing of the system messages. If the electronic device is not fully powered, processing proceeds at block 324. If the electronic device 104 is fully powered, processing ends. For example, if the electronic device 104 is a television and the television is "turned on" to view television programming by a command from a user, processing ends at block 322 without powering down the device circuitry 206 within the television. This enables receipt and processing of system messages by the electronic device 104 while it is in the full power mode.

At block 324, the device circuitry 206 powered up to process the system messages is powered down and processing returns to block 308 to wait for additional security messages.

The steps of flow chart 300 describe a situation in which the electronic device 104 is powered down when system messages are received. If system messages are received when the electronic device 104 is powered up, the interface circuitry 204 may store at least a portion of the system messages before they are passed to the device circuitry 206 or the interface circuitry 204 may pass the system messages directly to the device circuitry 206.

The present invention enables processing of system messages received when device circuitry is in a powered down state. System messages are processed through the use of the interface circuitry 204 that either "wakes up" the device circuitry to process system messages or stores the system messages until the device circuitry enters a powered up state in response to the electronic device 104 entering the full power mode. Thus, device circuitry can enter a powered down state to conserve power without missing system messages Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for processing system messages including data at an electronic device having at least a full power mode and a low power mode, the electronic device including device circuitry that is in a powered up state in the full power mode and in a powered down state or a powered up state in the low power mode, the method comprising the steps of:

receiving at least one system message including data for processing by the electronic device while the electronic device is in the low power mode;

generating a message available indicator responsive to the at least one system message;

generating a process message signal responsive to at least one of (i) the message available indicator and (ii) the data of the at least one system message;

transitioning the device circuitry within the electronic device from the powered down state to the powered up state while remaining in the low power mode responsive to the process message signal; and processing the data of the at least one system message using the device circuitry in the powered up state while in the low power mode.

2. The method of claim 1, further comprising the step of:

transitioning the device circuitry from the powered up state to the powered down state after processing the data of the at least one system message.

3. The method of claim 2, further comprising the step of:

determining if additional system messages including data are received during the processing of the data of the at least one system message;

wherein said processing step further comprises processing the data of each of the additional system messages prior to transitioning from the powered up state to the powered down state.

4. The method of claim 1, wherein the at least one system message is received via message circuitry and wherein the step of generating the message available indicator comprises the steps of:

polling the message circuitry for the at least one message; and generating the message available indicator responsive to polling the message circuitry if the at least one message is available.

5. The method of claim 1, wherein the at least one system message is received via message circuitry and wherein the message available indicator is an interrupt generated by the message circuitry responsive to the at least one system message.

6. The method of claim 1, wherein the step of generating the process message signal comprises the steps of:
   identifying a priority level for the data of each of the at least one system messages;
   generating the process message signal responsive to system message data having a first priority level; and
   storing system messages including data having a second priority level are stored for processing when the electronic device enters the full power mode.

7. The method of claim 1, wherein the step of generating the process message signal comprises the steps of:
   identifying one or more of the at least one system messages including data containing new information; and
   generating the process message signal responsive to the new information system message data;
   wherein system messages including data without new information are discarded.

8. An apparatus for processing system messages including data received from a service provider, the apparatus having a full power mode and a low power mode, the apparatus comprising:
   message circuitry configured to receive at least one system message and to generate a message available indicator responsive to receipt of the at least one system message;
   interface circuitry coupled to the message circuitry, the interface circuitry configured to receive at least one system message and to generate a process message signal responsive to the at least one system message; and
   device circuitry coupled to the interface circuitry, the device circuitry having a powered up state when the apparatus is in the full power mode and both a powered down state and a powered up state when the apparatus is in the low power mode, the device circuitry initially configured in the powered down state when the apparatus is in the low power mode and is further configured to transition to the powered up state while the apparatus remains in the low power mode responsive to the receipt of the process message signal from the interface circuitry.

9. The apparatus of claim 8, wherein the device circuitry comprises:
   a first processor configured to receive and process the process message signal when the device circuitry is in the powered down state, the first processor generating a power up signal responsive to receipt of the process message signal; and
   a second processor coupled to the first processor, the second processor having a processing state and a standby state, the second processor initially configured in the standby state when the apparatus is in the low power mode and is further configured to transition to the processing state to process the at least one system message responsive to the power up signal.

10. The apparatus of claim 8, wherein the device circuitry is further configured to transition from the powered up state to the powered down state after processing the at least one system message.

11. The apparatus of claim 8, wherein the interface circuitry is configured to poll the message circuitry to determine if the at least one message is available, receive a message available indicator if the at least one system message is available, and generate the process message signal responsive to the message available indicator.

12. The apparatus of claim 8, wherein the message available indicator is an interrupt generated by the message circuitry and wherein the interface circuitry is configured to generate the process message signal responsive to the interrupt.

13. The apparatus of claim 8, wherein the interface circuitry comprises:
   a memory configured to store at least a portion of the at least one system message; and
   a processor coupled to the memory, the processor configured to generate the process message signal responsive to a predefined portion of the memory being filled by the at least one system message.

14. The apparatus of claim 13, wherein the processor is configured to process the at least one system message to identify a priority level for each system message and wherein the processor generates the process message signal responsive to system messages having a first priority level and stores system messages having a second priority level in the memory for processing when the apparatus enters the full power mode.

15. The apparatus of claim 8, wherein the interface circuitry is configured to process the at least one system message to identify new system message data and wherein the interface circuitry generates the process message signal responsive to the new system message data and discards other system message data.

16. The apparatus of claim 8, wherein the electronic device is a television receiver.

17. A system for processing system messages including data at an electronic device having at least a full power mode and a low power mode, the electronic device including device circuitry that is in a powered up state in the full power mode and in a powered down state or a powered up state in the low power mode, the system comprising:
   means for receiving at least one system message including data for processing by the electronic device while the electronic device is in the low power mode;
   means for generating a message available indicator responsive to the at least one system message;
   means for generating a process message signal responsive to at least one of (i) the message available indicator and (ii) the data of the at least one system message;
   means for transitioning the device circuitry within the electronic device from the powered down state to the powered up state while the system remains in the low power mode responsive to the process message signal; and
   means for processing the data of the at least one system message using the device circuitry in the powered up state while the system remains in the low power mode.

18. The system of claim 17, further comprising:
   means for transitioning the device circuitry from the powered up state to the powered down state after processing the data of the at least one system message.

19. The system of claim 18, further comprising:
   means for determining if additional system messages including data are received during the processing of the data of the at least one system message;
   wherein said processing means further comprises means for processing the data of each of the additional system messages prior to transitioning from the powered up state to the powered down state.

20. The system claim 17, wherein the at least one system message is received via message circuitry and wherein the means for generating the message available indicator comprises:

means for polling the message circuitry for the at least one message; and means for generating the message available indicator responsive to the polling means if the at least one message is available.

21. The system of claim 17, wherein the message available indicator is an interrupt.

22. The system of claim 17, wherein the means for generating the process message signal comprises:

means for identifying a priority level for the data of each of the at least one system messages;

means for generating the process message signal responsive to system message data having a first priority level; and means for storing system messages including data having a second priority level for processing when the electronic device enters the full power mode.

23. The system of claim 17, wherein the means for generating the process message signal comprises:

means for identifying one or more of the at least one system messages including data containing new information; and means for generating the process message signal responsive to the new information system message data;

wherein system messages including data without new information are discarded.

* * * * *